United States Patent
Tan et al.

(10) Patent No.: US 10,686,835 B2
(45) Date of Patent: Jun. 16, 2020

(54) METHOD AND DEVICE FOR PROVIDING AUTHENTICATION INFORMATION ON WEB PAGE

(71) Applicant: BAIDU ONLINE NETWORK TECHNOLOGY (BEIJING) CO., LTD., Beijing (CN)

(72) Inventors: Jing Tan, Beijing (CN); Bingxin Chang, Beijing (CN); Yan Cui, Beijing (CN); Zhenping Zhang, Beijing (CN); Qi Zhou, Beijing (CN); Zheng Zhang, Beijing (CN); Changyang Dong, Beijing (CN); Xiaohang He, Beijing (CN); Kuan Shi, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 79 days.

(21) Appl. No.: 15/535,043

(22) PCT Filed: Oct. 10, 2015

(86) PCT No.: PCT/CN2015/091600
§ 371 (c)(1),
(2) Date: Sep. 29, 2017

(87) PCT Pub. No.: WO2016/091002
PCT Pub. Date: Jun. 16, 2016

(65) Prior Publication Data
US 2018/0034853 A1    Feb. 1, 2018

(30) Foreign Application Priority Data

Dec. 10, 2014  (CN) .......................... 2014 1 0759242

(51) Int. Cl.
| | | |
|---|---|---|
| G06F 21/44 | (2013.01) | |
| H04L 29/06 | (2006.01) | |
| G06F 16/951 | (2019.01) | |
| H04L 9/32 | (2006.01) | |
| G06F 16/958 | (2019.01) | |

(52) U.S. Cl.
CPC ........ H04L 63/1483 (2013.01); G06F 16/951 (2019.01); G06F 16/958 (2019.01);
(Continued)

(58) Field of Classification Search
CPC ..... H04L 63/1483; H04L 63/08; G06F 21/44; G06F 17/30864; G06F 2221/2119
(Continued)

(56) References Cited

U.S. PATENT DOCUMENTS

2005/0283609 A1* 12/2005 Langford ................ G06F 21/64
                                                             713/176
2006/0015722 A1    1/2006 Rowan et al.
(Continued)

FOREIGN PATENT DOCUMENTS

CN        102375925 A        3/2012
CN        102375952 A  *     3/2012
(Continued)

OTHER PUBLICATIONS

International Search Report in PCT/CN2015/091600 dated Jan. 7, 2016, 2 pages.
(Continued)

Primary Examiner — Haresh N Patel
(74) Attorney, Agent, or Firm — Nixon Peabody LLP

(57) ABSTRACT

The present disclosure provides a method for an authentication system to provide authentication information for a web page, comprising: receiving a request for authentication information from a web page; judging whether the web page is redirected to through a relevant search engine; judging whether the web page satisfies a condition of displaying the authentication information; and providing the authentication information to the web page satisfying the condition. By providing authentication information to a web site through a search engine, with the combination of the authentication (Continued)

system with the relevant search engine, the reliability and security of authentication information are enhanced. Besides, the user may autonomously edit and manage the displaying pattern of the authentication information, such that the authentication information may be displayed in real time on the web page.

13 Claims, 2 Drawing Sheets

(52) U.S. Cl.
CPC ............... *G06F 21/44* (2013.01); *H04L 9/32* (2013.01); *G06F 2221/2119* (2013.01); *H04L 63/08* (2013.01)

(58) Field of Classification Search
USPC .......................................................... 726/22
See application file for complete search history.

(56) References Cited

U.S. PATENT DOCUMENTS

| | | | |
|---|---|---|---|
| 2011/0055249 A1* | 3/2011 | Consuegra | G06F 21/33 707/769 |
| 2011/0283174 A1 | 11/2011 | M'Raihi et al. | |
| 2012/0030732 A1* | 2/2012 | Shaty | G06F 21/50 726/3 |
| 2013/0124856 A1* | 5/2013 | Agrawal | H04L 63/10 713/156 |
| 2013/0198612 A1 | 8/2013 | Ceze et al. | |
| 2014/0189123 A1* | 7/2014 | Dodd | H04L 47/70 709/226 |
| 2015/0347582 A1* | 12/2015 | Lovelace | G06F 21/60 707/706 |
| 2016/0182520 A1* | 6/2016 | Liu | H04L 63/126 726/4 |
| 2018/0337930 A1* | 11/2018 | Dong | H04L 63/08 |

FOREIGN PATENT DOCUMENTS

| | | |
|---|---|---|
| CN | 102611707 A | 7/2012 |
| CN | 102937977 A | 2/2013 |
| CN | 103856438 A | 6/2014 |
| CN | 104572873 A | 4/2015 |

OTHER PUBLICATIONS

First Office Action in Application No. 201410759242.9 dated Jun. 1, 2017, 20 pages.
Guo Min Uw, Mass Watermarking of Multimedia, Dated 2007; Zhejiang University; 129 Pages.

* cited by examiner

METHOD AND DEVICE FOR PROVIDING AUTHENTICATION INFORMATION ON WEB PAGE

CROSS REFERENCE TO RELATED APPLICATIONS

The present application is a national phase application of International Application No. PCT/CN2015/091600, filed on Oct. 10, 2015, which claims the benefit from Chinese Patent Application Serial No. 201410759242.9 filed on Dec. 10, 2014, entitled "Method and Apparatus for Providing Authentication Information on a Web Page." Content of the prior application is incorporated by reference herein.

FIELD OF THE INVENTION

The present disclosure relates to the field of computers, and more particularly to a method and apparatus for providing authentication information on a web page.

BACKGROUND OF THE INVENTION

With rapid evolution of Internet technologies, the issue of trustworthiness becomes critical to the development of Internet. It becomes more common for users to solve problems through the Internet, e.g., querying life information, purchasing commodities, etc.; so, Internet trustworthiness is a major issue of a user's concern. Therefore, an endorsement on the Internet by a reliable third party for an enterprise, with corresponding authentication information being granted, has become one of important guarantees for credibility of the enterprise.

At present, when a user is browsing a web page, authentication information related to the web page is usually directly embedded in the web page by a third party. The content of authentication information as displayed is fixed and inflexible, and the user cannot autonomously select and edit the authentication information, such that displaying of the authentication information on a web page is greatly restricted. In addition, as an essential tool for a user to perform web search, a search engine also has a function of providing corresponding authentication information to a web page searched by the user. However, currently there are no technologies and methods that combine the function of an authentication system to provide authentication information for a search engine so as to further enhance the reliability of the authentication information.

SUMMARY OF THE INVENTION

One of the technical problems solved by the present invention is to provide a method for providing authentication information on a web page, which method may display authentication information on a web page in real time according to a user's selection and edition.

An embodiment according to one aspect of the present invention provides a method for an authentication system to provide authentication information for a web page, comprising:
receiving a request for authentication information from a web page;
judging whether the web page is redirected to through a relevant search engine;
judging whether the web page satisfies a condition of displaying the authentication information; and
providing the authentication information to the web page satisfying the condition.

Optionally, the request for authentication information is issued through steps below:
receiving, by a search engine, a search request;
displaying links to search results according to the search request;
redirecting, based on one selected link to a search result, to a web page corresponding to the link, the web page being embedded with a specific script code, the request for authentication information being issued through the specific script code.

Optionally, a segment of code is provided to a registered user in advance as the script code embedded in the web page of the registered user, for requesting and displaying the authentication information.

Optionally, a URL of the web page embedded with the script code is obtained through the script code.

Optionally, the method further comprises:
recommending a web page associated with the authentication information but without installation of the script code to the user through web search.

Optionally, judging whether the web page issuing the request for authentication information is redirected to through a relevant search engine comprises:
if the web page is redirected to through the relevant search engine, entering subsequent steps of determining and providing the authentication information associated with the search engine;
if the web page is not redirected to through the relevant search engine, rejecting to provide the authentication information.

Optionally, the condition of displaying the authentication information comprises:
judging whether the authentication information matching the URL of the web page issuing the request for authentication information is stored; and
whether the authentication information is displayed on the web page;
when and only when the authentication information matching the URL of the web page is stored and the authentication information is set to being displayed on the web page, providing the authentication information to the web page; otherwise, not providing.

Optionally, an interface for editing a displaying manner of the authentication information is provided to the user.

Optionally, the displaying manner of the authentication information comprises:
whether the authentication information is displayed on the web page, a format of displaying, and a position on the web page.

Optionally, an interface for batch editing the URLs of all web pages installed with script codes is provided to the user; wherein the registered user may select among the URLs of all web pages installed with the script code through the URL batch editing interface, so as to display or not display the authentication information.

Optionally, the authentication information is obtained and authenticated through the authentication system associated with the search engine.

Optionally, a unique script code is provided to each registered user; dependent on different URLs of web pages installed with script codes, different authentication information of the registered user may be provided to different web pages installed with a same script code for a specific registered user.

An embodiment according to another aspect of the present invention provides an apparatus for providing authentication information to a web page, comprising:

a first module configured to receive a request for authentication information from a web page;

a second module configured to judge whether the web page is redirected to through a relevant search engine;

a third module configured to judge whether the web page satisfies a condition of displaying the authentication information; and a fourth module configured to provide the authentication information to the web page satisfying the condition.

Particularly, the apparatus further comprises a module configured to provide a script code, the script code being embedded into the web page for requesting and displaying a segment of code of the authentication information.

Optionally, the script code is for obtaining a URL of the web page that issues the request for authentication information.

Optionally, the second module is also configured to redirect to the third module when the web page issuing the request for authentication information is redirected to through the relevant search engine; otherwise, reject providing the authentication information.

Optionally, the third module is configured to:

judge whether the authentication information matching the URL of the web page is stored; and when the authentication information matching the URL of the web page is stored, judge whether the authentication information is set to being displayed on the web page;

when and only when the authentication information matching the URL of the web page is stored and the authentication information is set to being displayed on the web page, redirect to the fourth module; otherwise, reject providing the authentication information.

Optionally, the apparatus further comprises an interface for the user to edit a displaying manner of the authentication information.

Optionally, the displaying manner of the authentication information comprises:

whether the authentication information is displayed on the web page, a format of displaying, and a position on the web page.

Optionally, the apparatus also comprises an interface for the user to batch edit the URLs of all web pages installed with script codes; wherein a registered user may select among the URLs of all web pages installed with the script codes through the URL batch editing interface, so as to display or not display authentication information.

Optionally, the apparatus further comprises a module configured to recommend a web page associated with the authentication information but without installation of the script code to the user through web search.

Optionally, the authentication information is obtained and authenticated by an authentication system associated with the search engine.

Optionally, a unique script code is provided to each registered user; dependent on different URLs of web pages installed with script codes, different authentication information of the registered user may be provided to different web pages installed with a same script code for a specific registered user.

Besides, the present invention further provides a system for providing authentication information for a web site through a search engine, comprising the search engine and an apparatus for providing authentication information as mentioned above.

Optionally, the search engine is for receiving a search request and displaying links to search results according to the research request; and based on one selected link to a search result, redirecting to the web page corresponding to a link;

The apparatus for providing authentication information is for receiving a request for the authentication information issued by the web page and providing or not providing the authentication information to the web page.

In the embodiments of the present application, the authentication system provides authentication information to a web site through a search engine; through the method of combining the authentication system with the relevant search engine to provide authentication information to the web site, the reliability and security of authentication information are enhanced. Besides, by providing an interface for editing the content and format of the authentication information to display, the user can autonomously edit and manage the pattern of the authentication information, thereby overcoming the drawbacks of idle pattern and inconvenient management for the existing displaying od authentication information. Furthermore, a push condition for the authentication information is strictly restricted, which guarantees push security of the authentication information.

Those skilled in the art will appreciate that although the detailed description below will refer to the illustrated embodiments and drawings, the present invention will not be limited to these embodiments. Instead, the scope of the present disclosure is broad and intended to be limited only by the appended claims.

BRIEF DESCRIPTION OF THE ACCOMPANYING DRAWINGS

Other features, objectives, and advantages will become more apparent by reading detailed depictions of non-limiting embodiments with reference to the accompanying drawings.

DETAILED DESCRIPTION OF THE PREFERRED EMBODIMENTS

Hereinafter, the present invention will be described in further detail with reference to the accompanying drawings.

Figure 1:
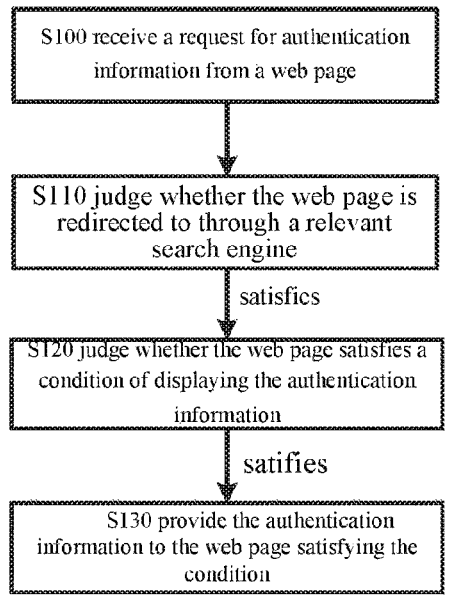
FIG. 1 is a flow diagram of a method for providing authentication information for a web page according to an embodiment of the present disclosure.

FIG. 1 is a flow diagram of a method for providing authentication information for a web page according to an embodiment of the present disclosure. The method in the present disclosure is mainly implemented by a server in a computer device. The server may be referred to as an apparatus for providing authentication information for a web page. The computer device includes, but not limited to, at least one of the following: a user equipment, a network device. The user equipment includes, but not limited to, a computer, a smart phone, a PDA, etc. The network device includes, but not limited to, a single network server, a server group consisting of a plurality of network servers, or a cloud consisting of a large number of computers or network servers based on cloud computing (the cloud computing is a kind of distributed computing), and a super virtual computer consisting of a group of loosely coupled computer clusters.

As illustrated in FIG. 1, according to embodiment 1, a method for an authentication system for providing authentication information for a web page mainly comprises steps below:

S100: receiving a request for authentication information from a web page;

S110: judging whether the web page is redirected to through a relevant search engine;

S120: judging whether the web page satisfies a condition of displaying the authentication information; and S130: providing the authentication information to the web page satisfying the condition. The method combines the search engine with the authentication system, such that the authentication information is provided only through the web page redirected to by the relevant search engine, which achieves the objective of providing, by the search engine, authentication information for a web page, thereby effectively enhancing the reliability of the authentication information.

Hereinafter, the respective steps will be introduced in further detail.

In step S100, receiving a request for authentication information from a web page may comprise receiving a request for authentication information voluntarily pushed by each web page.

Figure 2:
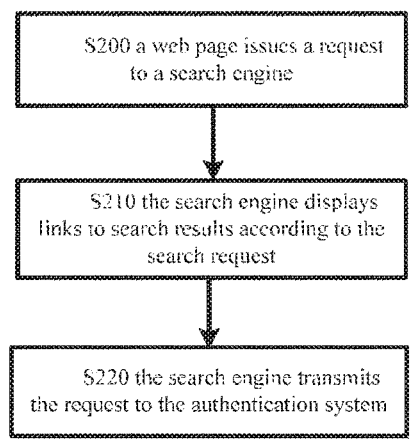
FIG. 2 is a flow diagram of a method for using a request for authentication information to an authentication system according to an embodiment of the present disclosure.

Particularly, the request for authentication information from a web page arrives at the authentication system in the following manners:

As illustrated in FIG. 2, the authentication information transmitted by the web page experiences 3 steps to arrive at the authentication system. First, in step S200, the search engine receives a search request from the user; specifically, the user initiates a search request to the search engine via a user equipment and/or a network device. The user equipment includes, but not limited to a computer, a smart phone, and a PDA, etc.

Second, in step S210, the search engine displays links to search results according to the search request. The search results may be sorted according to categories such as relevance with the user search, date, and classification. The user clicks onto a search result to open a certain linked web page.

Finally, in step S220, after the user selects to enter the certain link, the search engine redirects to the web page corresponding to the link based on the user's selection. If a specific script code is embedded in the web page, the specific script code automatically issues a request for authentication information to the authentication system. After receiving the request, the authentication system enters a subsequent step to judge whether the web page issuing the request is eligible to display authentication information, and to push or not to push the authentication information to the web page according to a result of the judging. Particularly, the script code is a segment of code provided to a registered user as a website administrator in advance, for being embedded into the web page of the registered user to request and display the authentication information; and through the script code, URLs of the web pages embedded with the script code may be obtained, the URLs being fed back to the authentication system. The authentication system provides the URLs obtained through the script code for the website administrator who manages and confirms the URLs, selects a URL of the web page that is needed to display the authentication information, and provides the selected result for the authentication system to store, so as to be available for matching or other purposes during other operations.

An advantage of obtaining the URLs of the web pages installed with a script code through the specific script code is that the network administrator needn't know in advance which web pages are installed with the specific script code. For example, the web site administrator may embed the script code allocated by the authentication system into a page head or page foot file of the web site files, such that all web pages containing the pager head or page foot will contain the script code. When a visitor opens a web page embedded with the specific script code, retrieving the authentication information will be automatically requested to the authentication system. Because the website administrator possibly does not want the authentication information to be displayed on each web page in the website managed thereby so as not to cause unnecessary interference to the visitor. Therefore, the website administrator may log onto the authentication system to perform a uniform management on selecting and setting the URLs of the web pages installed with the script code as collected by the script code, such that only the request for authentication information from URLs of part of the web pages is allowed to be returned with the authentication information to display.

Next, the method proceeds to step S110 to judge whether the web page is redirected to through a relevant search engine.

For a web page embedded with a script file, when the web page is opened, the script file will obtain information about the manner of opening the current web page, e.g., whether it is opened by directly entering the website address or redirected to and opened by a result link of the search engine, etc. The script file will automatically issue an authentication information request signal to the authentication system regarding the information about the manner of opening the web page. For a network user browsing the web page, there are a plurality of manners that may open the web page: directly opening by entering the website address, directly opening through a third-party recommendation. In order to enhance the reliability of the authentication system and strengthen the relevance between the search engine and the authentication system, the authentication system only pushes authentication information to a web page which is redirected to and opened through the search engine. Specifically, when the authentication system receives the authentication information request signal from the web page, it autonomously judges whether the web page is redirected to through a relevant search engine; if the web page is redirected to through the relevant search engine, the method enters the subsequent steps of determining and providing authentication information; if the web page is not redirected to through the relevant search engine, the request for the authentication information from the web page will be rejected.

Particularly, there exists a certain relevance between the search engine and the authentication system. The authentication system may belong to a same system as the search engine or belong to a third party. For example, the Baidu authentication system only pushes authentication information to a web page redirected to by Baidu or other search engine having an authentication relationship with the Baidu authentication system, and does not push relevant authentication information to a web page redirected to through other search engine or to a web page opened through other manners.

Particularly, the authentication information is obtained and authenticated through an authentication system associated with the search engine. The authentication system providing authentication information may include one or more authentication systems, wherein each authentication system is independent from one another, e.g., the authentication system may simultaneously include the Baidu credit system, Google credit system, Taobao credit system, and other credit system. Each credit system may be associated with one or more search engines, e.g., Baidu credit system may be only associated with Baidu search engine, or may be associated with other search engines such as Sougou and Google in other manner, such that the search engine may access Baidu credit system to obtain the authentication information. Meanwhile, each search engine may be only associated with one authentication system or may be associated with a plurality of authentication systems. By obtaining the authentication information through an authentication system associated with the search engine, the objective of providing endorsement to the authentication information through a search engine is achieved, which enhances reliability of the authentication information.

When the user opens a specific web page through a relevant search engine, a request for the authentication information is issued to the authentication system, then the authentication system will provide the authentication information associated with the web page in the authentication system associated with the search engine to the web page satisfying the condition.

An objective of the step is to judge the manner of opening the web page by the user, so as to reject the request for authentication information from the web page that is opened by other manners.

Through the above step, the conditions for displaying the authentication information on the web page visited by the visitor are effectively limited. In actual life, a user may access a specific web page in a plurality of ways, e.g., directly entering the website address to open the web page, or opening the web page through a third-party recommendation. In order to achieve the objective of endorsing the authentication information of the web page by the search engine, the present invention provides specific specifications on the manner of opening the web page, intended to cause the authentication system to display the authentication information endorsed by the search engine on the web page only when the web page is searched and redirected to and opened through the search engine. The authentication information carries the logo or identifier of the search engine, indicating that the authentication is confirmed by the service system associated with the search engine. For example, the authentication information provided by Baidu and carrying Baidu logo is displayed on the web page redirected to through Baidu search engine. The same web page opened through redirecting from other search engine may display the authentication information provided by the other search engine.

Next, the method proceeds to step S120 to judge whether the web page satisfies the condition of displaying the authentication information. Specifically, for the authentication information request issued by the web page passing the judgment of S110, which is redirected to through the search engine, the authentication system makes further judgment about the web page.

First, it is judged whether the URL of the web page issuing the request for authentication information matches a URL stored in the authentication system. This is because the script code embedded into the web page is very easily stolen by a third party to be installed on other web page; if authentication information is pushed to the web page in response to the request without judging the information transferred back by the script code, the authentication information will be arrogated or even abused to provide unmatched authentication information to other unauthenticated web page, thereby causing potential risks to network security; meanwhile, it will greatly reduce the reliability of the authentication system. Therefore, it needs to be identified whether the authentication system has stored authentication information matching the URL of the web page. Besides, because the user may autonomously select a display state of authentication information on a specified web page, it is needed to judge whether the authentication information on the web page is set to being displayed on the web page. When and only when the authentication system has stored the authentication information matching the URL of the web page and the authentication information is set to being displayed on the web page, will the authentication information be provided to the web page; otherwise, the authentication information will not be provided to the web page. An objective of this step is to guarantee that the authentication information is only pushed to a web page associated with the userid of the user so as to protect security of the authentication information.

Finally, the method proceeds to step S130 to provide authentication information for the web page satisfying the condition. In other words, the authentication system pushes the authentication information, which is associated with the web page that issues the request, to the web page.

In the method provided in the present embodiment, the authentication information is generated through the steps below:

The user registers an account on the authentication website with a userid (user identifier) being generated; the authentication data filled in based on the userid include at least one of the following: a website address, ICP filing number of the website, and the name, business scope, and industry of the company to which the website belongs, etc., each userid corresponding to a plurality of authentication data. The authentication data autonomously filled in by the user, after passing authentication by the authentication system, are stored and integrated with passive authentication data, to generate complete authentication information about the user. The passive authentication data include: netizens' comment data on the website, e.g., content of the comments, number of the comments, likes ratio, etc., which are matched and provided by the authentication system according to the user's userid. In order to avoid the inconvenience of operation, error-proneness, inefficiency and other problems caused by the user's manual filling in the URLs of the websites that need to obtain the authentication information, the present invention provides a novel method. Specifically, the authentication website generates a unique script code for each userid, wherein the script code is for being embedded into the user's web page to request and display a segment of code of the authentication information; the user autonomously downloads the script code and installs the script code onto a relevant web page; the script code establishes a connection channel for real-time communication between the web page and the authentication system. The script code obtains the URLs of the web pages embedded with the script code, and feeds them back to the authentication system; the authentication system provides the information of all URLs to the user. Meanwhile, the authentication system may recommend a web page associated with the authentication information but without installation of the script code to a registered user through web search. In this way, the steps for the user to apply the authentication system are greatly simplified, real-time dynamic information is provided to the user, and it is convenient for the user to manage the web page belonging to his/herself. Particularly, the authentication system provides different or identical script codes for each registered user; dependent on different URLs of the web pages installed with the script code, different authentication information of the registered user may be provided to different web pages installed with the same script code of the specific registered user. Besides, the user may also select to generate different script codes according to different displaying manners of the authentication information, such that the system function can be flexibly adjusted based on user selection.

It needs to be noted that, because the script code installed on the web page is easily obtained, and further installed on other web page so as to request the authentication system for obtaining the authentication information corresponding to the script code. In order to avoid the user's authentication information from being arrogated by other non-registered user to other web page, the authentication system imposes a strict examination on the web page that requests pushing the authentication information. Specifically, the URL fed back by the script code is matched with the user's URL in the authentication system; only the URL matching the URL of the web page installed with the script code and confirmed by the user is eligible to obtain the authentication information.

Finally, in order to make the display pattern of the authentication information satisfy different demands of different clients, the authentication system provides an interface for the user to autonomously edit the authentication information, such that the user may edit the authentication information patter displayed on the web page through the interface. The edition contents include:

A. whether the authentication information is displayed on the page;

The web site installed with the script code may have a single page or may have a plurality of sub-pages. The user may edit the authentication information of the web site and select whether to display the authentication information on each page included in the web site; the authentication system displays or does not display the authentication information on the corresponding page according to the user's edition.

B. displaying pattern of the authentication information on the web page, including the color, shape, and position on the web page of the authentication information, etc.;

The authentication system provides a plurality of authentication information displaying patterns for the user. The color, shape, and position on the web page may be autonomously selected by the user; the color of the authentication information may include given colors provided by the system database, e.g., red, blue, pink, green, yellow, etc., or may be obtained by the user through a color picker; the shape of the authentication information includes various kinds of geometrical shapes such as rectangle, circle, triangle, and polygon, etc., wherein the rectangle includes square and oblong shape, the circle includes oval; the position of the authentication information may be any position on the page, including the top, middle, bottom, footer of the page; the user may select among display positions given by the system; the position may also be specifically set through the coordinates. FIG. 5(*a*) and FIG. 5(*b*) specifically provide two different possible patters of the authentication information in other embodiments, which are only exemplary illustrations of the present invention and cannot be interpreted as limitations to the present invention.

The patterns of displaying the authentication information may also include direct displaying and indirect displaying; the manner of direct displaying refers to directly displaying the authentication information edited by the user on the web page; while indirect displaying refers to displaying the icon of the authentication information rather than the content of the authentication information on the web page; when a network user browsing the page clicks onto the icon, or the mouse slides through the icon (for a touch screen, when the user touches the icon or the finger slides through the icon), the icon of the authentication information is unfolded to all contents of the authentication information; optionally, when the user clicks onto the icon again, or when the mouse slides through the icon, the authentication information is folded to the form of icon. The authentication information icon may be visible or hidden according to the user's selection; it may be existent separately or attached to an existing element attached onto the web page.

C. whether the content of the authentication information is completely displayed on the web page;

After the authentication system integrated the authentication information corresponding to each userid, complete authentication information of the userid is generated, including authentication data completely filled in by the user autonomously and passive authentication data; all contents of the authentication information are presented to the user of the userid piece by piece through an interaction module. The user may screen and determine the authentication information provided by the system piece by piece, to select whether to display each piece of the authentication information is displayed on the web page. The authentication system generates final authentication information according to the user's selection.

Besides, the authentication system recommends to the user a web page associated with the authentication information without installation of script code through web search, such that the user clearly understands which websites cannot display authentication information; in this way, script code is installed on the web page that needs displaying authentication information dependent on the needs.

Optionally, because the registered user owns a plurality of web sites that need installation of script code, some websites need to display the authentication information while some websites needn't, dependent on the needs. In order to avoid inconvenience of installing and deleting script code for the same website, the authentication system provides the user with an interface for batch editing the URLs of all web pages installed with the script code; wherein the content to edit includes: letting the selected URL display or not display the authentication information. For web pages installed with the script code, if it is not required to display authentication information, batch management and selection may be performed through the interaction interface between the user and the authentication system, without a need of deleting the script code already installed in the website, which greatly facilitates user operation.

Optionally, the user may edit separately the authentication information on a plurality of URLs corresponding to each userid, i.e., the authentication information displayed on different websites belonging to the same userid may be identical or different.

In the present embodiment, judging of an opening path for a specific web page is performed by the authentication system. In embodiment 2 provided by the present invention, the judgment may be performed by a script code having a specific function. Specifically, embodiment 2 will be described in detail hereinafter.

Embodiment 2 depicts a method for an authentication system to provide authentication information for a web page, mainly comprising steps below:

S100. receiving authentication information request data from a web page;

S110. judging whether the web page is redirected to through a relevant search engine;

S120. judging whether the web page satisfies a condition for displaying the authentication information;

S130. providing authentication information for the web page satisfying the condition.

The method combines the search engine with the authentication system, such that the authentication information is provided only through the web page redirected to by the relevant search engine, which achieves the objective of providing, by the search engine, authentication information for a web page, thereby effectively enhancing the reliability of the authentication information.

Hereinafter, respective steps will be discussed in further detail.

In step S100, receiving an authentication information request from the web page may comprise: receiving authentication information request voluntarily pushed by each web page; it may be the case of receiving the authentication information request from one web page at one time, or the cause of receiving the authentication information requests from a plurality of web pages simultaneously.

Particularly, the request for authentication information from a web page arrives at the authentication system in the following manners:

As illustrated in FIG. 2, the authentication information transmitted by the web page experiences 3 steps to arrive at the authentication system. First, in step S200, the search engine receives a search request from the user; specifically, the user initiates a search request to the search engine via a user equipment and/or a network device. The user equipment includes, but not limited to a computer, a smart phone, and a PDA, etc.

Second, in step S210, the search engine displays links to search results according to the search request. The search results may be sorted according to categories such as relevance with the user search, date, and classification. The user selects whether to enter a certain link in the search results.

Finally, in step S220, after the user selects to enter the certain link, the search engine redirects to the web page corresponding to the link based on the user's selection. If a specific script code is embedded in the web page, the specific script code automatically issues a request for authentication information to the authentication system. After receiving the request, the authentication system enters a subsequent step to judge whether the web page issuing the request is eligible to display authentication information, and to push or not to push the authentication information to the web page according to a result of the judging.

Through the above step, the conditions for displaying the authentication information on the web page visited by the visitor are effectively limited. In actual life, a user may access a specific web page in a plurality of ways, e.g., directly entering the website address to open the web page, or opening the web page through a third-party recommendation. In order to achieve the objective of endorsing the authentication information of the web page by the search engine, the present invention provides specific specifications on the manner of opening the web page, intended to cause the authentication system to display the authentication information endorsed by the search engine on the web page only when the web page is searched and redirected to and opened through the search engine.

Next, the method proceeds to step S110 to judge whether the web page is redirected to through a relevant search engine. An objective of the step is to implement the function of the search to provide authentication information for a user and strengthen the reliability of the authentication information.

For a web page embedded with a script file, when the web page is opened, the script file will judge the manner of opening the web page. When and only when the web page is opened through the step above, will the script code issues a signal for requesting authentication information to the authentication system, while if the web page is opened through other manners, the script code will not issue a request to the authentication system. Directly judging through the script code avoids transmission of redundant information between the web page and the authentication system, which alleviates system burden and enhances efficiency.

Particularly, there exists a certain relevance between the search engine and the authentication system. The authentication system may belong to a same system as the search engine or belong to a third party. For example, the Baidu authentication system only pushes authentication information to a web page redirected to by Baidu or other search engine having an authentication relationship with the Baidu authentication system, and does not push relevant authentication information to a web page redirected to through other search engine or to a web page opened through other manners.

Particularly, the authentication system providing authentication information may include one or more authentication systems, wherein each authentication system is independent from one another, e.g., the authentication system may simultaneously include the Baidu credit system, Google credit system, Taobao credit system, and other credit system. Each credit system may be associated with one or more search engines, e.g., Baidu credit system may be only associated with Baidu search engine, or may be associated with other search engines such as Sougou and Google in other manner, such that the search engine may access Baidu credit system to obtain the authentication information. Meanwhile, each search engine may be only associated with one authentication system or may be associated with a plurality of authentication systems.

When the user opens a specific web page through a relevant search engine, a request for the authentication information is issued to the authentication system, then the authentication system will provide the authentication information associated with the web page in the authentication system associated with the search engine to the web page satisfying the condition.

An objective of the step is to judge the manner of opening the web page by the user, so as to reject the request for authentication information from the web page that is opened by other manners.

Next, the method proceeds to step S120 to judge whether the web page satisfies the condition of displaying the authentication information. An objective of the step is to guarantee that the authentication information is only pushed onto the web page associated with the userid of the user, thereby protecting the security of the authentication information.

Specifically, for authentication information issued by the web page passing the judgment in S110, which is redirected to through the search engine, the authentication system makes further judgment about the web page.

First, it is judged whether the URL of the web page issuing the request for authentication information matches a URL stored in the authentication system. This is because the script code embedded into the web page is very easily stolen by a third party to be installed on other web page; if authentication information is pushed to the web page in response to the request without judging the information transferred back by the script code, the authentication information will be arrogated or even abused to provide unmatched authentication information to other unauthenticated web page, thereby causing potential risks to network security; meanwhile, it will greatly reduce the reliability of the authentication system. Therefore, it needs to be identified whether the authentication system has stored authentication information matching the URL of the web page. Besides, because the user may autonomously select a display state of authentication information on a specified web page, it is needed to judge whether the authentication information on the web page is set to being displayed on the web page. When and only when the authentication system has stored the authentication information matching the URL of the web page and the authentication information is set to being displayed on the web page, will the authentication information be provided to the web page; otherwise, the authentication information will not be provided to the web page. An objective of this step is to guarantee that the authentication information is only pushed to a web page associated with the userid of the user so as to protect security of the authentication information.

Finally, the method proceeds to step S130 to provide authentication information for the web page satisfying the condition. In other words, the authentication system pushes the authentication information, which is associated with the web page that issues the request, to the web page.

The two embodiments above provide a method for an authentication system to provide authentication information for a website through a search engine. By providing authentication information for the website through the combination of the authentication system and relevant search engine, the reliability and security of the authentication information are enhanced.

Correspondingly, the present disclosure further provides another embodiment of applying the method to provide authentication information for a web site through a search engine, which will be described in detail with reference to the accompanying drawings.

Figure 3:
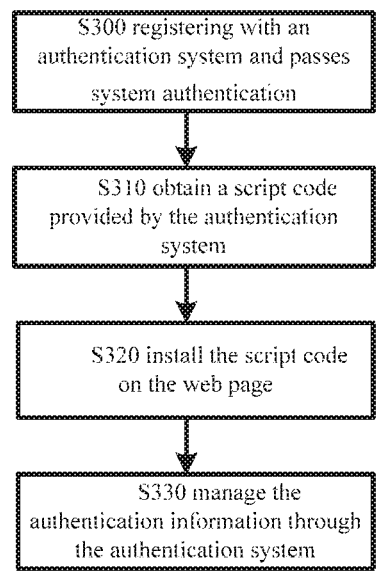
FIG. 3 is a flow diagram of managing authentication information by a user according to an embodiment of the present disclosure.

As shown in FIG. 3, a user who needs an authentication system to provide authentication information for his/her own website has to perform the following 4 steps in sequence.

First, in step S300, the user registers an account on the authentication website with a userid (user identifier) being generated; the authentication data filled in based on the userid include at least one of the following: a website address, ICP filing number of the website, and the name, business scope, and industry of the company to which the website belongs, etc., each userid corresponding to a plurality of authentication data. The authentication data autonomously filled in by the user, after passing authentication by the authentication system, are stored and integrated with passive authentication data, to generate complete authentication information about the user. The passive authentication data include: netizens' comment data on the website, e.g., content of the comments, number of the comments, likes ratio, etc., which are matched and provided by the authentication system according to the user's userid.

Second, in step S310, the authentication website generates a unique script code for each userid, wherein the script code is for being embedded into the user's web page to request and display a segment of code of the authentication information; the user autonomously downloads the script code.

Next, in step S320, the user installs the script code onto a relevant web page; the script code establishes a connection channel for real-time communication between the web page and the authentication system. The script code obtains the URLs of the web pages embedded with the script code, and feeds them back to the authentication system; the authentication system provides the information of all URLs to the user.

In an embodiment, the process above will be exemplarily depicted in detail with Vipshop as the user and Baidu authentication system and Baidu search engine as the authentication system and the relevant search engine.

The Vipshop registers with Baidu authentication system; a unique user ID is generated, e.g., Vipshop. Afterwards, information such as its website, the ICP filing number of the website, the name, business scope, and industry of the company to which the website belongs is filled into the authentication system. After authentication by Baidu authentication system, Baidu authentication system extracts passive authentication data associated with Vipshop from its database and generates complete authentication information of Vipshop. Then, Baidu authentication system generates a segment of script code for the user, the script code containing user information and corresponding authentication information of Vipshop. The script code may be encrypted or not encrypted.

After obtaining the script code, Vipshop installs the script code to its own web page; in this way, a connection channel for real-time communication is established between the web page installed with the script code and Baidu authentication system, so as to obtain real-time authentication information from Baidu authentication system.

Because Baidu authentication system imposes a strict limitation on the condition for providing authentication information for a web page, only when the web page is searched and redirected to through Baidu search engine, will it obtain the authentication information pushed by Baidu authentication system; and for other ways, e.g., directly entering the website address to enter the website, directly entering the website through a third-party recommendation, Baidu authentication system will not push the authentication information to the web page.

In addition, because the script code installed on the web page is easily obtained and further installed on other web page so as to request the authentication system for obtaining the authentication information corresponding to the script code. In order to avoid the user's authentication information from being arrogated by other non-registered user to other web page, the authentication system imposes a strict examination on the web page that requests pushing the authentication information. Specifically, the URL fed back by the script code is matched with the user's URL in the authentication system; only the URL matching the URL of the web page installed with the script code and confirmed by the user is eligible to obtain the authentication information.

With Vipshop as an example, if a third party obtains the script code containing the authentication information of Vipshop from the Vipshop website and installs it on an illegal phishing website, then the content of the phishing website will be very similar to Vipshop. After the script code is installed, the script code will issue a request for obtaining authentication information to Baidu authentication system, and feed back the URL of the web page to Baidu authentication system. Baidu authentication system will match the URL of the web page with the URL of the Vipshop in the authentication system; because each web page only has a unique URL, while the URL of the phishing website is not stored in Baidu authentication system, the system will not push authentication information thereto, thereby guaranteeing security of the authentication information. In addition, if the authentication system discovers that the script code for obtaining the authentication information is stolen, it will immediately notify the administrator of the authentication website that a counterfeit phishing website likely exists.

Finally, in step S330, the user may edit a displaying pattern of the authentication information on the web page through the connection channel.

The authentication system provides an interface for the user to edit the displaying pattern of the authentication information, via which interface the user may edit the displaying pattern of the authentication information on the web page. The edition contents include:

A. whether the authentication information is displayed on the page;

The web site installed with the script code may have a single page or may have a plurality of sub-pages. The user may edit the authentication information of the web site and select whether to display the authentication information on each page included in the web site; the authentication system displays or does not display the authentication information on the corresponding page according to the user's edition.

For example, the website of Vipshop contains a home page and other sub-pages. If Vipshop only wants to display the authentication on the home page and a part of sub-pages, all pages may be edited and selected, such that the authentication information is displayed on the selected page.

B. displaying pattern of the authentication information on the web page, including the color, shape, and position on the web page of the authentication information, etc.;

The authentication system provides a plurality of authentication information displaying patterns for the user. The color, shape, and position on the web page may be autonomously selected by the user; the color of the authentication information may include given colors provided by the system database, e.g., red, blue, pink green, yellow, etc., or may be obtained by the user through a color picker; the shape of the authentication information includes various kinds of geometrical shapes such as rectangle, circle, triangle, and polygon, etc., wherein the rectangle includes square and oblong shape, the circle includes oval; the position of the authentication information may be any position on the page, including the top, middle, bottom, footer of the page; the user may select among display positions given by the system; the position may also be specifically set through the coordinates.

The patterns of displaying the authentication information may also include direct displaying and indirect displaying; the manner of direct displaying refers to directly displaying the authentication information edited by the user on the web page; while indirect displaying refers to displaying the icon of the authentication information rather than the content of the authentication information on the web page; when a network user browsing the page clicks onto the icon, or the mouse slides through the icon (for a touch screen, when the user touches the icon or the finger slides through the icon), the icon of the authentication information is unfolded to all contents of the authentication information; optionally, when the user clicks onto the icon again, or when the mouse slides through the icon, the authentication information is folded to the form of icon. The authentication information icon may be visible or hidden according to the user's selection; it may be existent separately or attached to an existing element attached onto the web page.

C. whether the content of the authentication information is completely displayed on the web page;

After the authentication system integrated the authentication information corresponding to each userid, complete authentication information of the userid is generated, including authentication data completely filled in by the user autonomously and passive authentication data; all contents of the authentication information are presented to the user of the userid piece by piece through an interaction module. The user may screen and determine the authentication information provided by the system piece by piece, to select whether to display each piece of the authentication information is displayed on the web page. The authentication system generates final authentication information according to the user's selection.

Optionally, the authentication system recommends to the user a web page associated with the authentication information without installation of script code through web search, such that the user clearly understands which websites cannot display authentication information; in this way, script code is installed on the web page that needs displaying authentication information dependent on the needs.

Optionally, because the registered user owns a plurality of web sites that need installation of script code, some websites need to display the authentication information while some websites needn't, dependent on the needs. In order to avoid inconvenience of installing and deleting script code for the same website, the authentication system provides the user with an interface for batch editing the URLs of all web pages installed with the script code; wherein the content to edit includes: letting the selected URL display or not display the authentication information. For web pages installed with the script code, if it is not required to display authentication information, batch management and selection may be performed through the interaction interface between the user and the authentication system, without a need of deleting the script code already installed in the website, which greatly facilitates user operation.

Optionally, the user may edit separately the authentication information on a plurality of URLs corresponding to each userid, i.e., the authentication information displayed on different websites belonging to the same userid may be identical or different.

For the authentication information in the prior art, the user needs to manually fill in the URL of the web page that needs installation of the authentication; the authentication system directly embeds relevant authentication information into the web page; moreover, parameters like the content and pattern of the authentication information displayed on the web page are fixed; consequently, it is impossible to flexibly adjust according to user needs. The technical solution provided by the present disclosure well solves the two problems.

Figure 4:
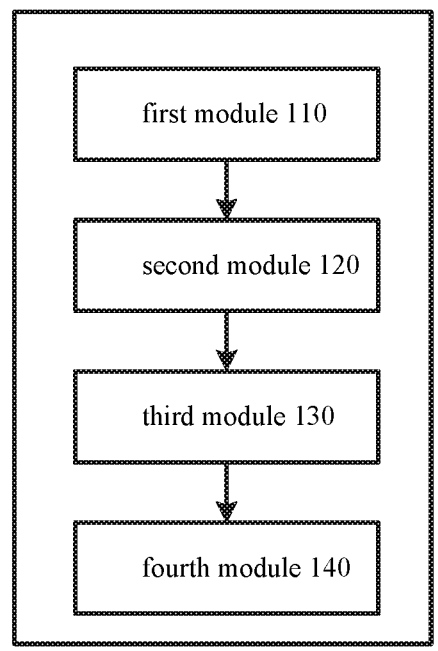
FIG. 4 is a schematic diagram of an apparatus for providing authentication information for a web page according to an embodiment of the present disclosure; and Same or similar reference numerals in the drawings represent same or similar parts.

The embodiments above of the present application describe a method for a search engine to provide authentication information for a web page. Based on the same thoughts as the method, an embodiment of the present disclosure further provides an apparatus for a search engine to provide authentication information for a website. As shown in FIG. 4, the apparatus mainly comprises: a first module 110 configured to receive a request for authentication information from a web page; a second module 120 configured to judge whether the web page is redirected to through a relevant search engine; a third module 130 configured to judge whether the web page satisfies a condition of displaying the authentication information; and a fourth module 140 configured to provide the authentication information to the web page satisfying the condition.

The first module 110 is configured to receive an authentication information request from the web page. Specifically, receiving an authentication information request from the web page may comprise: receiving authentication information request voluntarily pushed by each web page; it may be the case of receiving the authentication information request from one web page at one time, or the cause of receiving the authentication information requests from a plurality of web pages simultaneously.

The first module also comprises a module configured to provide a script code, the script code being embedded into the web page for requesting and displaying a segment of code of the authentication information, wherein the script code is for obtaining a URL of the web page that issues the request for authentication information.

Particularly, the request for authentication information from a web page arrives at the authentication system in the following manners:

First, the search engine receives a search request from the user; specifically, the user initiates a search request to the search engine via a user equipment and/or a network device. The user equipment includes, but not limited to a computer, a smart phone, and a PDA, etc. The search engine displays links to search results according to the search request. The search results may be sorted according to categories such as relevance with the user search, date, and classification. The user selects whether to enter a certain link in the search results. After the user selects to enter the certain link, the search engine redirects to the web page corresponding to the link based on the user's selection. A specific script code is embedded in the web page, via which specific script code, a request for authentication information is automatically issued to the authentication system.

Particularly, the script code is a segment of code provided by the authentication system to the registered user for being embedded in the user's web page so as to request and display the authentication information, the script code being generated by the following method:

The user registers an account on the authentication website with a userid (user identifier) being generated; the authentication data filled in based on the userid include at least one of the following: a website address, ICP filing number of the website, and the name, business scope, and industry of the company to which the website belongs, etc., each userid corresponding to a plurality of authentication data. The user installs the script code onto a relevant web page; the script code establishes a connection channel for real-time communication between the web page and the authentication system. The script code obtains the URLs of the web pages embedded with the script code, and feeds them back to the authentication system; the authentication system provides the information of all URLs to the user. The user may edit the authentication information displayed on the web page via the connection channel.

The content of authentication information includes the authentication data autonomously filled by the user and passive authentication data. The passive authentication data include: content of the comments, number of the comments, likes ratio, etc., which are matched and provided by the authentication system according to the user's userid.

The authentication system stores and integrated all of the authentication information above and generate the complete authentication information about the user. The authentication system provides the user with an interface for editing the displaying content and format of the authentication information; the user may edit the displayed content of the authentication on the web page via the interface. The edited content includes:

A. whether the authentication information is displayed on the page;

The web site installed with the script code may have a single page or may have a plurality of sub-pages. The user may edit the authentication information of the web site and select whether to display the authentication information on each page included in the web site; the authentication system displays or does not display the authentication information on the corresponding page according to the user's edition.

B. displaying pattern of the authentication information on the web page, including the color, shape, and position on the web page of the authentication information, etc.;

The authentication system provides a plurality of authentication information displaying patterns for the user. The color, shape, and position on the web page may be autonomously selected by the user; the color of the authentication information may include given colors provided by the system database, e.g., red, blue, pink, green, yellow, etc., or may be obtained by the user through a color picker; the shape of the authentication information includes various kinds of geometrical shapes such as rectangle, circle, triangle, and polygon, etc., wherein the rectangle includes square and oblong shape, the circle includes oval; the position of the authentication information may be any position on the page, including the top, middle, bottom, footer of the page; the user may select among display positions given by the system; the position may also be specifically set through the coordinates.

The patterns of displaying the authentication information may also include direct displaying and indirect displaying; the manner of direct displaying refers to directly displaying the authentication information edited by the user on the web page; while indirect displaying refers to displaying the icon of the authentication information rather than the content of the authentication information on the web page; when a network user browsing the page clicks onto the icon, or the mouse slides through the icon (for a touch screen, when the user touches the icon or the finger slides through the icon), the icon of the authentication information is unfolded to all contents of the authentication information; optionally, when the user clicks onto the icon again, or when the mouse slides through the icon, the authentication information is folded to the form of icon. The authentication information icon may be visible or hidden according to the user's selection; it may be existent separately or attached to an existing element attached onto the web page.

C. whether the content of the authentication information is completely displayed on the web page;

After the authentication system integrated the authentication information corresponding to each userid, complete authentication information of the userid is generated, including authentication data completely filled in by the user autonomously and passive authentication data; all contents of the authentication information are presented to the user of the userid piece by piece through an interaction module. The user may screen and determine the authentication information provided by the system piece by piece, to select whether to display each piece of the authentication information is displayed on the web page. The authentication system generates final authentication information according to the user's selection.

Optionally, the user may edit separately the authentication information on a plurality of URLs corresponding to each userid, i.e., the authentication information displayed on different websites belonging to the same userid may be identical or different.

The second module 120 is configured to judge whether the web page is redirected to through a relevant search engine. The second module is also configured to redirect to the third module when the web page issuing the request for authentication information is redirected to through the relevant search engine; otherwise, reject providing the authentication information. An objective of this module is to implement the function of providing authentication information for a user through the search engine and strengthen the reliability of authentication information.

For a web page embedded with a script file, when the web page is opened, the script file will automatically issue an authentication information request signal to the authentication system. For a network user browsing the web page, there are a plurality of manners that may open the web page: directly opening by entering the website address, directly opening through a third-party recommendation. In order to enhance the reliability of the authentication system and strengthen the relevance between the search engine and the authentication system, the authentication system only pushes authentication information to a web page which is redirected to and opened through the search engine.

Particularly, there exists an authentication relationship between the search engine and the authentication system. The authentication system may belong to a same system as the search engine or belong to a third party. For example, the Baidu authentication system only pushes authentication information to a web page redirected to by Baidu or other search engine having an authentication relationship with the Baidu authentication system, and does not push relevant authentication information to a web page redirected to through other search engine or to a web page opened through other manners.

The third module is configured to judge whether the authentication information matching the URL of the web page is stored; and when the authentication information matching the URL of the web page is stored, judge whether the authentication information is set to being displayed on the web page; when and only when the authentication information matching the URL of the web page is stored and the authentication information is set to being displayed on the web page, redirect to the fourth module; otherwise, reject providing the authentication information. An objective of this module is to ensure that the push information is only pushed to the web page associated with the user's userid so as to protect security of the authentication information. Specifically, for the authentication information request issued by the web page passing the judgment of the second module 120, which is redirected to through the search engine, the authentication system makes further judgment about the web page.

First, it is judged whether the URL of the web page issuing the request for authentication information matches a URL stored in the authentication system. This is because the script code embedded into the web page is very easily stolen by a third party to be installed on other web page; if authentication information is pushed to the web page in response to the request without judging the information transferred back by the script code, the authentication information will be arrogated or even abused to provide unmatched authentication information to other unauthenticated web page, thereby causing potential risks to network security; meanwhile, it will greatly reduce the reliability of the authentication system. Therefore, it needs to be identified whether the authentication system has stored authentication information matching the URL of the web page. Besides, because the user may autonomously select a display state of authentication information on a specified web page, it is needed to judge whether the authentication information on the web page is set to being displayed on the web page. When and only when the authentication system has stored the authentication information matching the URL of the web page and the authentication information is set to being displayed on the web page, will the authentication information be provided to the web page; otherwise, the authentication information will not be provided to the web page.

The fourth module 140 is configured to provide authentication information for a web page satisfying the condition. The authentication system pushes the authentication information associated with the web page issuing the request to the web page through the module.

Optionally, the authentication system further comprises an interface for the user to edit a displaying manner of the authentication information.

Optionally, the displaying manner of the authentication information comprises: whether the authentication information is displayed on the web page, a format of displaying, and a position on the web page.

Optionally, the authentication system also comprises an interface for the user to batch edit the URLs of all web pages installed with script codes; wherein a registered user may select among the URLs of all web pages installed with the script codes through the URL batch editing interface, so as to display or not display authentication information. Optionally, the authentication system further comprises a module configured to recommend a web page associated with the authentication information but without installation of the script code to the user through web search.

Optionally, the authentication information is obtained and authenticated by an authentication system associated with the search engine.

An embodiment according to a further embodiment of the present disclosure provides a system for authenticating a web site through a search engine, comprising an apparatus for providing authentication information and a search engine. The search engine is for receiving a search request and displaying links to search results according to the research request; and based on one selected link to a search result, redirecting to the web page corresponding to a link; the apparatus for providing authentication information is for receiving a request for the authentication information issued by the web page and providing or not providing the authentication information to the web page.

In the embodiments of the present application, the method of the authentication system providing authentication information to a web site through a search engine enhances the reliability and security of authentication information, by means of the method of combining the authentication system with the relevant search engine to provide authentication information to the web site. Besides, by providing an interface for editing the content and format of the authentication information to display, the user can autonomously edit and manage the pattern of the authentication information, thereby overcoming the drawbacks of idle pattern and inconvenient management for the existing displaying od authentication information. Furthermore, a push condition for the authentication information is strictly restricted, which guarantees push security of the authentication information.

It should be noted that the present disclosure may be implemented in software and/or a combination of software and hardware. For example, each module of the present disclosure may be implemented by an application-specific integrated circuit (ASIC) or any other similar hardware device. In one embodiment, the software program of the present disclosure may be executed through a processor to implement the steps or functions as mentioned above. Likewise, the software program (including relevant data structure) of the present disclosure may be stored in a computer readable recording medium, e.g., RAM memory, magnetic or optic driver or soft floppy or similar devices. Additionally, some steps or functions of the present disclosure may be implemented by hardware, for example, a circuit cooperating with the processor so as to implement various steps or functions.

Further, a portion of the present disclosure may be applied as a computer program product, for example, a computer program instruction, which, when executed by the computer, may invoke or provide a method and/or technical solution according to the present disclosure through operations of the computer. Further, the program instruction invoking the method of the present disclosure may be stored in a fixed or mobile recording medium, and/or transmitted through broadcast or data flow in other signal bearer media, and/or stored in a working memory of a computer device which operates based on the program instruction. Here, in an embodiment according to the present disclosure, an apparatus comprises a memory for storing a computer program instruction and a processor for executing the program instruction, wherein when the computer program instruction is executed by the processor, the apparatus is triggered to run the methods and/or technical solutions according to a plurality of embodiments of the present disclosure.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. A method for providing authentication information for a web page, comprising:
receiving a request for authentication information from code embedded in the web page that includes content displayed on a web browser in response to being opened thereby;
determining whether the web page is redirected to through a relevant search engine;
when the web page is not redirected to through the relevant search engine, rejecting to provide the authentication information;
when the web page is redirected to through the relevant search engine, performing following operations:
determining whether the web page satisfies a condition of displaying the authentication information by judging whether a URL of the webpage matches a pre-stored URL; and
responsive to determining that the web page satisfies the condition of displaying the authentication information, providing the authentication information to the web page satisfying the condition, wherein the authentication information is obtained and authenticated through an authentication system associated with the relevant search engine.

2. The method according to claim 1, wherein the embedded code requests and displays the authentication information, and obtains the URL of the web page and feeds the URL to the authentication system.

3. The method according to claim 1, wherein the code is a script code and is in a page head or a page foot of a file corresponding to the web page.

4. The method according to claim 1, further comprising:
providing an interface for editing a displaying manner of the authentication information is provided to the registered user.

5. The method according to claim 4, wherein the displaying manner of the authentication information comprises:
whether the authentication information is displayed on the web page, a format of displaying the authentication information, and a position the authentication information displayed on the web page.

6. An apparatus for providing authentication information to a web page, comprising:
at least one processor; and
a memory storing instructions, the instructions when executed by the at least one processor, cause the at least one processor to perform operations, the operations comprising:
receiving a request for authentication information from code embedded in the web page that includes content displayed on a web browser in response to being opened thereby;
determining whether the web page is redirected to through a relevant search engine;
when the web page is not redirected to through the relevant search engine, rejecting to provide the authentication information;
when the web page is redirected to through the relevant search engine, performing following operations:
determining whether the web page satisfies a condition of displaying the authentication information by judging whether a URL of the webpage matches a pre-stored URL; and
responsive to determining that the web page satisfies the condition of displaying the authentication information, providing the authentication information to the web page satisfying the condition, wherein the authentication information is obtained and authenticated through an authentication system associated with the relevant search engine.

7. The apparatus according to claim 6, wherein the step of determining whether the web page satisfies a condition of displaying the authentication information further comprises:
determining whether the authentication information matching the URL of the web page is stored; and when the authentication information matching the URL of the web page is stored, determining whether the authentication information is displayed on the web page;

when the authentication information is set to being displayed on the web page, redirecting to the subsequent step of providing the authentication information to the web page satisfying the condition; otherwise, the step of determining whether the web page satisfies a condition of displaying the authentication information further comprises rejecting to provide the authentication information.

8. The apparatus according to claim 6, wherein the operations further comprise:

providing an interface for a registered user to edit a displaying manner of the authentication information.

9. The apparatus according to claim 8, wherein the displaying manner of the authentication information comprises:

whether the authentication information is displayed on the web page, a format of displaying the authentication information, and a position of the authentication information displayed on the web page.

10. The apparatus according to claim 6, wherein the operations further comprise:

recommending the web page associated with the authentication information but without installation of a script code to a user through web search.

11. A system for providing authentication information for a web site through a search engine, the system comprising the search engine and an apparatus for providing authentication information, the apparatus comprising:

receiving a request for authentication information from code embedded in the web page that includes content displayed on a web browser in response to being opened thereby;

determining whether the web page is redirected to through a relevant search engine;

when the web page is not redirected to through the relevant search engine, rejecting to provide the authentication information;

when the web page is redirected to through the relevant search engine, performing following operations:

determining whether the web page satisfies a condition of displaying the authentication information by judging whether a URL of the webpage matches a pre-stored URL; and responsive to determining that the web page satisfies the condition of displaying the authentication information, providing the authentication information to the web page satisfying the condition, wherein the authentication information is obtained and authenticated through an authentication system associated with the search engine.

12. The system according to claim 11, wherein the search engine is configured to receive a search request and display links to search results according to the search request; and based on one selected link to one of the search results, redirect to the web page corresponding to the selected link; and the apparatus for providing authentication information is configured to receive the request for the authentication information issued by the web page and provide or not provide the authentication information to the web page.

13. A non-transitory computer storage medium storing computer instructions which, when being executed, cause operations to be performed, the operations comprising:

receiving a request for authentication information from code embedded in a web page that includes content displayed on a web browser in response to being opened thereby;

determining whether the web page is redirected to through a relevant search engine;

when the web page is not redirected to through the relevant search engine, rejecting to provide the authentication information;

when the web page is redirected to through the relevant search engine, performing following operations:

determining whether the web page satisfies a condition of displaying the authentication information by judging whether a URL of the webpage matches a pre-stored URL; and responsive to determining that the web page satisfies the condition of displaying the authentication information, providing the authentication information to the web page satisfying the condition, wherein the authentication information is obtained and authenticated through an authentication system associated with the relevant search engine.

* * * * *